United States Patent
Tsukada et al.

[11] Patent Number: 6,129,980
[45] Date of Patent: Oct. 10, 2000

[54] ANTI-REFLECTION FILM AND DISPLAY DEVICE HAVING THE SAME

[75] Inventors: Yoshihisa Tsukada; Tomokazu Yasuda; Junichi Yamanouchi, all of Kanagawa, Japan

[73] Assignee: Fuji Photo Film Co., Ltd., Kanagawa, Japan

[21] Appl. No.: 09/114,139

[22] Filed: Jul. 13, 1998

[30] Foreign Application Priority Data

Jul. 11, 1997 [JP] Japan .................................... 9-186288
Jul. 30, 1997 [JP] Japan .................................... 9-205094
Oct. 6, 1997 [JP] Japan .................................... 9-272550

[51] Int. Cl.$^7$ .................................................. G02B 1/11
[52] U.S. Cl. ......................... 428/327; 313/479; 349/137; 428/421; 428/447; 428/448; 428/451
[58] Field of Search .................................. 428/327, 421, 428/447, 448, 451; 313/479; 349/137

[56] References Cited

U.S. PATENT DOCUMENTS 4,904,525  2/1990  Taniguchi et al. .................... 428/328

*Primary Examiner*—D. S. Nakarani
*Attorney, Agent, or Firm*—Burns, Doane, Swecker & Mathis, LLP

[57] ABSTRACT

An anti-reflection film has a low refractive index layer and a high refractive index layer. The low refractive index layer is formed by coating a composition comprising (a) a hydrolysis product or a partial condensation product of an organosilane and (c) a vinyl resin. The organosilane is represented by the formula of $R^1Si(OR^2)_3$ in which $R^1$ is an alkyl group having 1 to 10 carbon atoms, an alkenyl group having 2 to 10 carbon atoms or an aryl group having 6 to 10 carbon atoms, and $R^2$ is an alkyl group having 1 to 5 carbon atoms or an acyl group having 1 to 4 carbon atoms. The vinyl resin has at least one silyl group substituted with a hydrolyzable group or hydroxyl.

17 Claims, 1 Drawing Sheet

ANTI-REFLECTION FILM AND DISPLAY DEVICE HAVING THE SAME

FIELD OF THE INVENTION

The present invention relates to an anti-reflection film suitable for lowering reflection of light on a displaying surface of a display device such as liquid crystal display (LCD). The invention also relates to a display device provided with the anti-reflection film.

BACKGROUND OF THE INVENTION

An anti-reflection film generally employed is a multi-layered film in which a plural number of transparent layers made of metal oxide are superposed one on another. The multi-layered film is usable for all the wavelength region of visible light. On the other hand, a monolayer anti-reflection film cannot effectively lower the reflection of light in a wide wavelength region such as visible light, while it is effective for lowering the reflection of monochromatic light.

In the multi-layered film, increase of the number of the layers enlarges a wavelength region of light for which the film can be applied. Therefore, the known anti-reflection film has three or more layers formed by physical or chemical deposition. However, the multi-layered anti-reflection film is produced by a complicated process comprising a number of deposition procedures corresponding to the number of the layers. In each deposition procedure, the conditions are precisely controlled so that each layer may have predetermined refractive index and thickness. Since the production process of the multi-layered film is very complicated as described above, it costs a lot and has poor mass-productivity. Further, it is very difficult to produce a large multi-layered film in the known manner.

An anti-reflection film in which its refractive index gradually changes at the interface between a substrate and air is also known. In Japanese Patent Provisional Publication No. 2(1990)-245702, $SiO_2$ having a middle refractive index between those of the glass substrate and $MgF_2$ is used to form an anti-reflection film. Fine particles of $SiO_2$ and $MgF_2$ are mixed and applied on the glass surface to form a coating film in which the mixing ratio changes gradually in the direction of the thickness so that the refractive index may gradually change. According to the descriptions of Japanese Patent Provisional Publication No. 2(1990)-245702, the film having the above structure effectively lowers the reflection.

Japanese Patent Provisional Publication No. 5(1993)-13021 discloses an anti-reflection film consisting of two layers containing fine particles of $SiO_2$ and $MgF_2$ dispersed in ethyl silicate. However, in the disclosed film, the first layer has the mixing ratio ($MgF_2/SiO_2$) of 7/3 and the refractive index of 1.42, while those of the second layer are 1/1 and 1.44, respectively. This refractive index difference is not enough to effectively lower the reflection.

Japanese Patent Provisional Publication No. 7(1995)-92305 discloses an anti-reflection film comprising fine particles having the refractive index of 1.428. The upper part of the film comprises the fine particles and air to have a low refractive index, and many fine concaves and convexes are provided on the surface. On the other hand, the lower part of the film comprises only the fine particles. The fine particle consists of core part and shell part, and the core part is made of, for example, methyl methacrylate, methacrylic acid, trifluoroethyl methacrylate or N-iso-butoxymethylacrylamide. The shell part is made of, for example, styrene, acrylic acid, or butyl acrylate.

Japanese Patent Provisional Publication No. 7(1995)-168006 discloses another anti-reflection film. The upper part of the film comprises fine particles (e.g., $MgF_2$) and air to have a low refractive index, and many fine concaves and convexes are provided on the surface. The intermediate part of the film comprises only the fine particles to have a middle refractive index, and the lower part comprises the fine particles and a binder.

SUMMARY OF THE INVENTION

The applicants have studied the known anti-reflection films, and noted that the reflection is lowered by changing the refractive index gradually along the direction of the thickness. However, formation of those films requires complicated procedures and skilled techniques, and further they can not satisfyingly lower the reflection.

An object of the present invention is to provide an anti-reflection film which gives low reflectance (less than 1%) evenly in a wide wavelength region and which has strong film strength, high durability and excellent heat resistance. In the invention, the film is prepared at low cost by the process suitable for mass-production of a large film.

Another object of the invention is to provide a display device provided with the anti-reflection film.

The present invention provides an anti-reflection film having a low refractive index layer and a high refractive index layer, wherein the low refractive index layer is formed by coating a composition comprising: (a) a hydrolysis product or a partial condensation product of an organosilane represented by the formula of $R^1Si(OR^2)_3$ in which $R^1$ is an alkyl group having 1 to 10 carbon atoms, an alkenyl group having 2 to 10 carbon atoms or an aryl group having 6 to 10 carbon atoms, and $R^2$ is an alkyl group having 1 to 5 carbon atoms or an acyl group having 1 to 4 carbon atoms; and (c) a vinyl resin having at least one silyl group substituted with a hydrolyzable group or hydroxyl in an amount of 2 to 300 weight parts.

The invention also provides a display device having a display surface covered with the anti-reflection film defined in claim 1, wherein the high refractive index layer is arranged between the display surface and the low refractive index layer.

The anti-reflection film of the invention comprises a low refractive index layer form by a condensation reaction between organic polymer and alkoxysilane. In the film, a high refractive index layer having the refractive index is provided with the low refractive index layer. The anti-reflection film of the invention has both excellent optical characteristics and strong film strength. Further, since it has high mass-productivity, the film of large size can be produced at low cost.

DETAILED DESCRIPTION OF THE INVENTION

Organosilane component (a)

Figure 1:
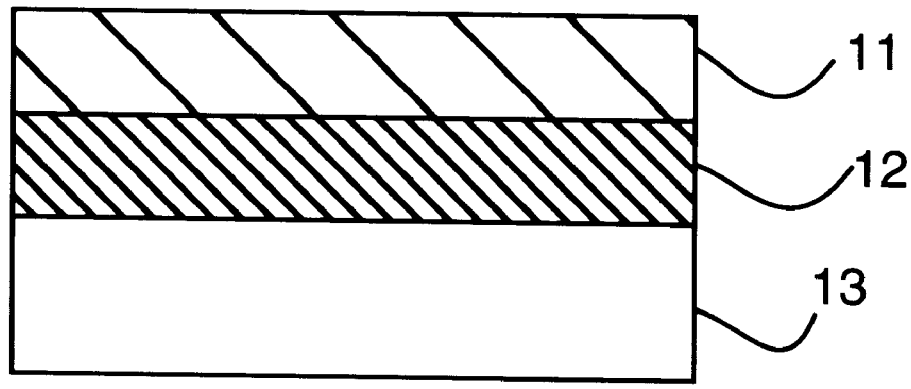
FIG. 1 is a sectional view schematically illustrating a layered structure of an anti-reflection film.

The composition for the low refractive index layer comprises a component (a), namely a hydrolysis product (a-1) or a partial condensation product (a-2) of an organosilane (a-0) represented by the formula of $R^1Si(OR^2)_3$. The component (a) functions as a binder in the low refractive index layer.

In the formula, $R^1$ is an alkyl group having 1 to 10 carbon atoms, an alkenyl group having 2 to 10 carbon atoms or an aryl group having 6 to 10 carbon atoms. The alkyl group preferably has 1 to 8 carbon atoms. The alkyl group may have a substituent group. Examples of the substituent groups include a halogen atom (e.g., fluoro, chloro), glycidoxy, an acyloxy group (e.g., methacryloyloxy), mercapto and an alkoxy group (e.g., methoxy, ethoxy, propoxy, trifluoromethoxy, pentafluoroethoxy, heptafluoropropoxy, cyclohexyloxy). Examples of the alkyl groups include methyl, ethyl, n-propyl, i-propyl, γ-chloropropyl, 3,3,3-trifluoropropyl, $C_2F_5CH_2CH_2CH_2$—, $C_3F_7CH_2CH_2CH_2$—, $C_2F_5CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, 3-(perfluorocyclohexyloxy)propyl, $H(CF_2)_4CH_2OCH_2CH_2CH_2$—, $H(CF_2)_4CH_2CH_2CH_2$ —, glycidoxypropyl, γ-methacrylolyoxypropyl, γ-mercaptopropyl and 3,4-epoxycyclohexylethyl. Examples of the alkenyl groups include vinyl. Examples of the aryl groups include phenyl.

In the formula, $R^2$ is an alkyl group having 1 to 5 carbon atoms or an acyl group having 1 to 4 carbon atoms. The alkyl group preferably has 1 to 4 carbon atoms. Examples of the alkyl groups include methyl, ethyl, n-propyl, i-propyl, n-butyl, tert-butyl. The acyl group preferably has 2 to 4 carbon atoms. Examples of the acryl groups include acetyl.

Examples of the organosilane (a-0) include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, vinyltrimethoxysilane, vinyltriethoxysilane, 3,3,3-trifluoropropyltrimethoxysilane, 3,3,3-trifluoropropyltriethoxysilane, γ-glycidoxypropyltrimethoxysilane, γ-glycidoxypropyltriethoxysilane, γ-methacryloyloxypropyltrimethoxysilane, γ-methacryloyloxypropyltriethoxysilane, γ-mercaptopropyltrimethoxysilane, γ-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane, $C_2H_5CH_2CH_2CH_2Si(OCH_3)_3$, $C_2F_5CH_2CH_2Si(OCH_3)_3$, $C_3F_7CH_2CH_2Si(OCH_3)_3$, $C_2F_5OCH_2CH_2CH_2Si(OCH_3)_3$, $C_3F_7OCH_2CH_2CH_2Si(OC_2H_5)_3$, $(CF_3)_2CHOCH_2CH_2CH_2Si(OCH_3)_3$, $C_4F_9CH_2OCH_2CH_2CH_2Si(OCH_3)_3$, $H(CF_2)_4CH_2OCH_2CH_2CH_2Si(OCH_3)_3$ and (perfluorocyclohexyloxy)propylsilane. The organosilane (a-0) preferably is methyltrimethoxysilane, methyltriethoxysilane or an organosilane containing a fluorine atom in $R^1$ (namely $R^1$ in the formula of $R^1Si(OR^2)_3$ is a fluorine-substituted alkyl group having 1 to 10 carbon atoms, a fluorine-substituted alkenyl group having 2 to 10 carbon atoms or a fluorine-substituted aryl group having 6 to 10 carbon atoms).

Two or more organosilanes (a-0) can be used in combination. In the case that two or more organosilanes (a-0) are used in combination, the mixture of the combination preferably contains $CH_3Si(OR^2)_3$ in an amount of more than 80 mol %. The weight average molecular weight of the component (a) is preferably in the range of 800 to 100,000, more preferably 1,000 to 50,000.

Diorganosilane component (b)

The composition for the low refractive index layer can further comprise a component (b), namely a hydrolysis product (b-1) or partial condensation product (b-2) of a diorganosilane (b-0) represented by the formula of $R^1_2Si(OR^2)_2$. The component (b) functions as a binder in the low refractive index layer. The component (b) has other functions of softening the formed film and of improving alkali resistance of the film.

In the formula, $R^1$ is an alkyl group having 1 to 10 carbon atoms, an alkenyl group having 2 to 10 carbon atoms or an aryl group having 6 to 10 carbon atoms, and $R^2$ is an alkyl group having 1 to 5 carbon atoms or an acyl group having 1 to 4 carbon atoms. The alkyl group preferably has 1 to 4 carbon atoms. The definitions and the examples of $R^1$ and $R^2$ are the same as those described in the component (a).

Examples of the diorganosilane (b-0) include dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane, diphenyldiethoxysilane, $(CF_3)CH_2CH_2)_2Si(OCH_3)_2$, $(CF_3CH_2CH_2CH_2)_2Si(OCH_3)_2$, $(C_3F_7OCH_2CH_2CH_2)_2Si(OCH_3)_2$, $[H(CF_2)_6CH_2OCH_2CH_2CH_2]_2Si(OCH_3)_2$ and $(C_2F_5CH_2CH_2)_2Si(OCH_3)_2$. The diorganosilane (b-0) preferably is dimethyldimethoxysilane, dimethyldiethoxysilane or a diorganosilane containing a fluorine atom in $R^1$ (namely, $R^1$ in the formula of $R^1_2Si(OR^2)_2$ is a fluorine-substituted alkyl group having 1 to 10 carbon atoms, a fluorine-substituted alkenyl group having 2 to 10 carbon atoms or a fluorine-substituted aryl group having 6 to 10 carbon atoms).

Two or more diorganosilanes (b-0) can be used in combination. The component (b) is used in combination with the component (a) to form a copolymer. The formed copolymer has a weight average molecular weight preferably in the range of 800 to 100,000, more preferably in the range of 1,000 to 50,000. The content of the component (b) in terms of the diorganosilane (b-0) in the composition is preferably in the range of 5 to 150 weight parts, more preferably in the range of 5 to 100 weight parts, and most preferably 10 to 60 weight parts based on 100 weight parts of the organosilane (a-0). If the content is more than 150 weight parts, the formed film has problems of poor adhesion and insufficient hardness.

Vinyl resin (c)

The composition for the low refractive index layer comprises a component (c), namely a vinyl resin having at least one silyl group substituted with a hydrolyzable group or hydroxyl. The vinyl resin (c) comprises a main chain of vinyl polymer. The vinyl resin (c) preferably has at least two silyl groups substituted with a hydrolyzable group or hydroxyl. The silyl group is attached to ends of the main chain or to the side chain. A preferred silyl group is represented by the following formula.

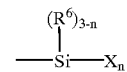

in which X is a hydrolyzable group or hydroxyl; $R^6$ is hydrogen, an alkyl group having 1 to 10 carbon atoms or an aralkyl group having 7 to 10 carbon atoms; and n is 1, 2 or 3. Examples of the hydrolyzable groups include a halogen atom (F, Cl, Br), an alkoxy group, an acyloxy group, aminoxy, an aryloxy group (e.g., phenoxy), an alkylthio group and amino.

The vinyl resin (c) can be prepared by a reaction (1) between a hydrosilane compound and a vinyl resin having carbon-carbon double bond. The vinyl resin (c) can also be prepared by a reaction (2) between a vinyl compound and a silane compound having the following formula.

$$R^7-\underset{(R^6)_{3-n}}{\underset{|}{Si}}-X_n \quad\quad 5$$

in which each of X, $R^6$ and n has the same meanings as defined above, and $R^7$ is an organic group having an unsaturated double bond (e.g., an alkenyl group).

Examples of the hydrosilane compounds used in the reaction (1) include a silane halide (e.g., methyldichlorosilane, trichlorosilane, phenyldichlorosilane), an alkoxysilane (e.g., methyldiethoxysilane, methyldimethoxysilane, phenyldiethoxysilane, trimethoxysilane, triethoxysilane), an acyloxysilane (e.g., methyldiacetoxysilane, phenyldiacetoxysilane, triacetoxysilane) and an aminosilane (e.g., methylaminoxysilane, triaminoxysilane, dimethylaminoxysilane, triaminoxysilane).

The vinyl resin used in the reaction (1) preferably does not contain hydroxyl as a substituent group. The vinyl resin preferably contains an unsaturated double bond in its side chain. The vinyl resin can be synthesized by a polymerization reaction of a vinyl monomer. The vinyl resin preferably is a copolymer of a vinyl monomer and a divinyl monomer (e.g., allyl methacrylate). Examples of the vinyl monomers include a (meth)acrylic ester (e.g., methyl (meth)acrylate, ethyl (meth)acrylate, butyl (meth)acrylate, 2-ethylhexyl (meth)acrylate, cyclohexyl (meth)acrylate), a carboxylic acid (e.g., (meth)acrylic acid, itaconic acid, fumaric acid), an acid anhydride (e.g., maleic anhydride), an epoxy compound (e.g., glycidyl (meth)acrylate), an amine (e.g., diethylaminoethyl (meth)acrylate, aminoethyl vinyl ether), an amide (e.g., (meth)acrylamide, itaconic diamide, α-ethylacrylamide, crotonic amide, fumaric diamide, maleic diamide, N-butoxymethyl(meth)acrylamide) and other vinyl compounds (e.g., acrylonitrile, styrene, α-methylstyrene, vinyl chloride, vinyl acetate, vinyl propionate). The following vinyl compounds containing a fluorine atom can also be used in the vinyl monomer.

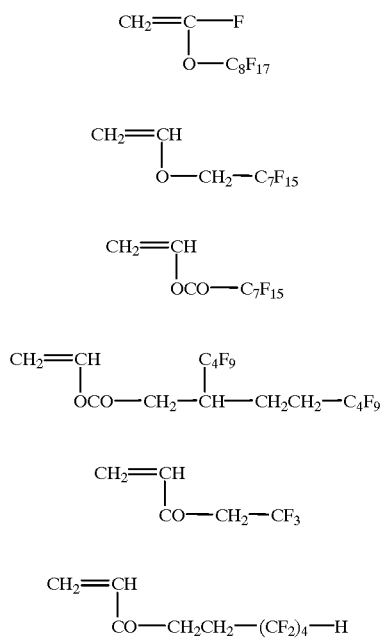
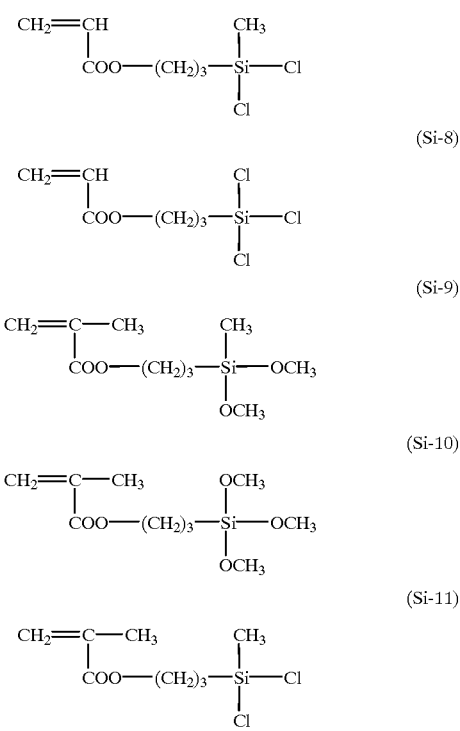
Examples of the silane compounds used in the reaction (2) are shown below.
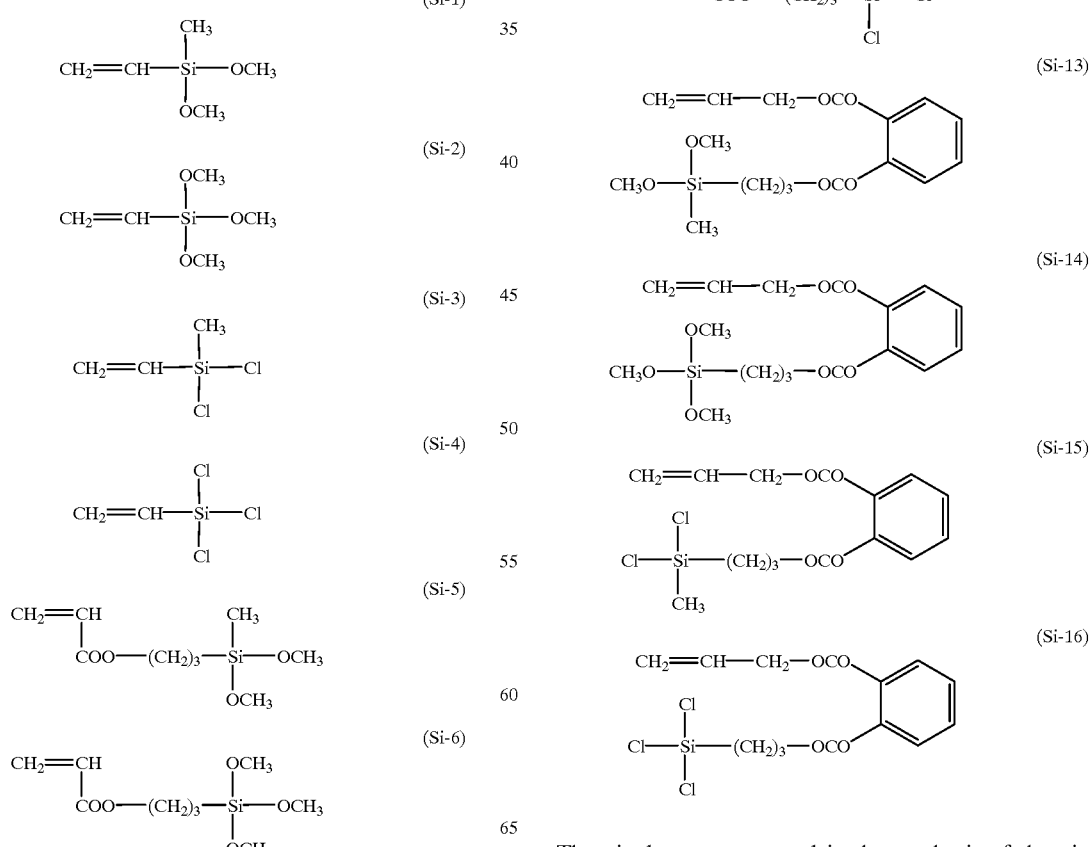
The vinyl monomers used in the synthesis of the vinyl resin of the reaction (1) can also be used in the reaction (2).

Further, a vinyl compound substituted with hydroxyl (e.g., 2-hydroxyethyl (meth)acrylate, 2-hydroxypropyl (meth) acrylate, 2-hydroxyvinyl ether, N-methylolacrylamide) can be used in the reaction (2).

An acrylic polymer containing trialkoxysilyl group is preferably used as the vinyl resin (c). The acrylic polymer is represented by the following formula.

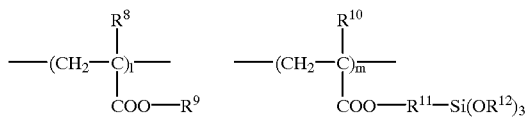

in which each of $R^8$ and $R^{10}$ independently is hydrogen or methyl, each of $R^9$ and $R^{12}$ independently is an alkyl group having 1 to 6 carbon atoms (e.g., methyl, ethyl, n-propyl, n-butyl, i-butyl, n-pentyl, n-hexyl), $R^{11}$ is an alkylene group having 1 to 4 carbon atoms (e.g., methylene, ethylene, propylene, butylene), and each of 1 and m is an integer satisfying the condition that m/(1+m) is 0.01 to 0.4 (preferably 0.02 to 0.2).

Examples of the vinyl resins (c) are shown below.

P1: Methyl methacrylate/γ-methacyloyloxypropyltrimethoxysilane copolymer (weight ratio: 90/10)

P2: Methyl methacrylate/γ-methacyloyloxypropyltrimethoxysilane copolymer (weight ratio: 85/15)

P3: Methyl methacrylate/γ-methacyloyloxypropyltrimethoxysilane copolymer (weight ratio: 80/20)

P4: Methyl methacrylate/γ-methacyloyloxypropyltrimethoxysilane copolymer (weight ratio: 70/30)

P5: Methyl methacrylate/ethyl acrylate/γ-methacyloyloxypropyltrimethoxysilane copolymer (weight ratio: 50/35/15)

P6: Ethyl methacrylate/γ-methacyloyloxypropyltrimethoxysilane copolymer (weight ratio: 85/15)

P7: n-Butyl methacrylate/styrene/γ-methacyloyloxypropyltrimethoxysilane copolymer (weight ratio: 50/35/15)

P8: Methyl methacrylate/methyl acrylate/γ-acyloyloxypropyltrimethoxysilane copolymer (weight ratio: 35/40/15)

P9: Methyl methacrylate/methyl acrylate/γ-acyloyloxypropyltrimethoxysilane copolymer (weight ratio: 40/40/20)

P10: Methyl methacrylate/n-butyl acrylate/vinyltrimethoxysilane copolymer (weight ratio: 60/30/10)

P11: FM-1/γ-methacyloyloxypropyltrimethoxysilane copolymer (weight ratio: 85/15)

P12: FM-1/γ-methacyloyloxypropyltrimethoxysilane copolymer (weight ratio: 90/10)

P13: FM-4/γ-methacyloyloxypropyltrimethoxysilane copolymer (weight ratio: 85/15)

P14: FM-4/γ-methacyloyloxypropyltrimethoxysilane copolymer (weight ratio: 70/30)

P15: FM-4/FM-7/γ-methacyloyloxypropyltrimethoxysilane copolymer (weight ratio: 30/55/15)

P16: FM-2/FM-4/γ-methacyloyloxypropyltrimethoxysilane copolymer (weight ratio: 30/50/20)

P17: FM-3/FM-4/γ-methacyloyloxypropyltrimethoxysilane copolymer (weight ratio: 25/60/15)

P18: FM-4/methyl methacrylate/γ-methacyloyloxypropyltrimethoxysilane copolymer (weight ratio: 60/25/15)

P19: FM-7/methyl methacrylate/γ-acyloyloxypropyltrimethoxysilane copolymer (weight ratio: 40/45/15)

P20: FM-4/methyl methacrylate/vinyltrimethoxysilane copolymer (weight ratio: 65/20/15)

The vinyl resin (c) is commercially available (for example, Kaneka-Zemrack, Kanegafuchi Kagaku Kogyo Kabushiki Kaisha).

A synthesis example of the vinyl resin (c) is shown below. The other vinyl resins can be synthesized according to a similar manner.

SYNTHESIS EXAMPLE 1
(Synthesis of vinyl resin P12)

In a reactor equipped with reflux condenser and stirrer, 32.4 g of the vinyl monomer (FM-4) and 3.6 g of γ-methacryloyloxypropyltrimethoxysilane were placed. The mixture was stirred at 750C in a stream of nitrogen. A solution of 4.8 g of 2,2'-azobis(2,4-dimethylvaleronitrile) (V-65, Wako Junyaku Co., Ltd.) in 25 ml of methyl ethyl ketone was added to the mixture, and simultaneously a mixture of 291.6 g of the vinyl monomer (FM-4), 32.4 g of γ-methacryloyloxypropyltrimethoxysilane and 19.2 g of 2,2'-azobis(2,4-dimethylvaleronitrile) was dropwise added to the mixture for 6 hours at a constant adding rate. After the addition, a solution of 4.8 g of 2,2'-azobis(2,4-dimethylvaleronitrile) in 25 ml of methyl ethyl ketone was added to the mixture. The resulting mixture was stirred at 75° C. for 4 hours. To the mixture, 280 ml of methyl ethyl ketone was further added. The resulting mixture was cooled to obtain 640 g of a solution of the vinyl resin P12. The solid content was 54.0 weight %. The number average molecular weight determined by gel-permeation chromatography was 8,300.

The number average molecular weight of the vinyl resin (c) is preferably in the range of 2,000 to 100,000, and more preferably in the range of 4,000 to 50,000.

The content of the vinyl resin (c) in the composition is preferably in the range of 2 to 300 weight parts, more preferably in the range of 5 to 200 weight parts, and most preferably in the range of 10 to 100 weight parts, based on 100 weight parts of the organosilane (a-0). If the content is less than 2 weight parts, the formed film has a problem of poor alkali resistance. If the content is more than 300 weight parts, the film has a problem of poor durability.

The low refractive index layer preferably comprises an organic silane polymer having a network structure. The network structure is formed by coating the composition, particularly the components (a), (b) and (c). Examples of the combinations of the components (a), (b) and (c) are shown below.

(SP-1)
Methyltrimethoxysilane (10 g), dimethyldimethoxysilane (5 g), 3,3,3-trifluoropropyltriethoxysilane (2 g) and P2 (2.5 g)

(SP-2)
Methyltrimethoxysilane (12 g), dimethyldiethoxysilane (8 g), 3,3,3-trifluoropropyltriethoxysilane (2 g) and P2 (3 g)

(SP-3)
Ethyltriethoxysilane (15 g), dimethyldiethoxysilane (5 g), 3,3,3-trifluorobutyltriethoxysilane (2 g) and P2 (2 g)

(SP-4)
Methyltrimethoxysilane (10 g), dimethyldimethoxysilane (5 g), 3,3,3-trifluoropropyltriethoxysilane (2 g) and P2 (1.5 g)

(SP-5)
Methyltrimethoxysilane (10 g), dimethyldimethoxysilane (5 g), perfluoroethoxypropyltrimethoxysilane (5 g) and P5 (2.5 g)

(SP-6)

Ethyltrimethoxysilane (20 g), 3,3,3-trifluorobutyltriethoxysilane (7 g), bis(3,3,3-trifluoropropyl)diethoxysilane (5 g) and P7 (3 g)

(SP-7)

Tetraethoxysilane (2 g), methyltrimethoxysilane (10 g), dimethyldimethoxysilane (5 g), 3,3,3-trifluoropropyltriethoxysilane (2 g) and P2 (2.5 g)

(SP-8)

Cyclohexyltrimethoxysilane (18 g), bis(3,3,3-trifluoropropyl)diethoxysilane (12 g), tetraethoxysilane (3 g) and P12 (5 g)

(SP-9)

Methyltrimethoxysilane (12 g), dimethyldipropoxysilane (10 g), 3,3,3-trifluoropropyltriethoxysilane (5 g) and P8 (2.5 g)

(SP-10)

Methyltriethoxysilane (12 g), dimethyldimethoxysilane (5 g), bis(3,3,3-trifluoropropyl)dimethoxysilane (5 g) and P8 (4.5 g)

Particles of fluorine-containing polymer (d)

The composition for the low refractive index layer can further comprise (d) particles of a fluorine-containing polymer. The particles have a mean particle size in the range of 5 to 200 nm, preferably in the range of 5 to 100 nm and more preferably in the range of 5 to 50 nm.

The polymer contains fluorine atoms preferably in an amount of 15 to 75 weight %, more preferably in an amount of 30 to 75 weight %, and most preferably in an amount of 35 to 75 weight %.

The polymers containing fluorine atoms are formed by polymerizing monomers containing a fluorine atom. Examples of the monomers include fluoroolefins (e.g., fluoroethylene, vinylidene fluoride, tetrafluoroethylene, hexafluoropropylene, perfluoro-2,2-dimethyl-1,3-dioxonol), acrylic or methacrylic esters of completely or partially fluorinated alkyl, alkenyl or aryl, completely or partially fluorinated vinyl ethers, completely or partially fluorinated vinyl esters and completely or partially fluorinated vinyl ketones. The acrylic or methacrylic esters of completely or partially fluorinated alkyl, alkenyl or aryl are preferred. Accordingly, the polymers containing fluorine atoms preferably comprises repeating units obtained from the following monomers.

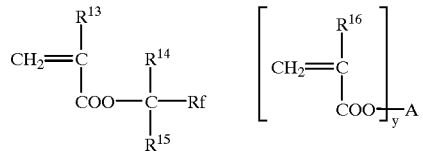

in which each of $R^{13}$ and $R^{16}$ independently is hydrogen, a halogen atom or an alkyl group having 1 to 3 carbon atoms, Rf is a completely or partially fluorinated alkyl, alkenyl heterocyclic or aryl group, each of $R^{14}$ and $R^{15}$ independently is hydrogen, an alkyl group, an alkyl group, an alkenyl group, a heterocyclic group, an aryl group or a completely or partially fluorinated alkyl, alkenyl heterocyclic or aryl group, A is a completely or partially fluorinated n-valent organic group, and n is an integer of 2 to 8. Each of Rf, $R^{13}$, $R^{14}$, $R^{15}$ and $R^{16}$ may have a substituent group other than fluorine. Two of Rf, $R^{14}$ and $R^{15}$ may be combined to form a ring.

Examples of the monomers containing fluorine atoms include FM-1 to FM-23 shown in the vinyl resin (c). Further, the following monomers FM-24 to FM-28 can also be used in the particles (d).

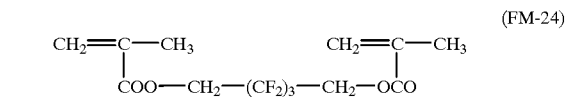

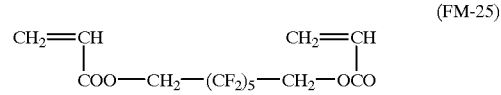

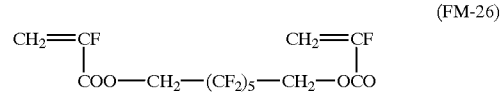

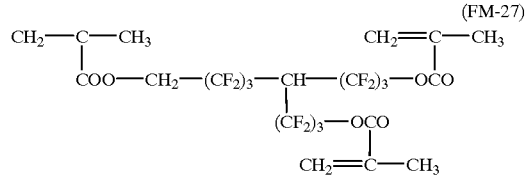

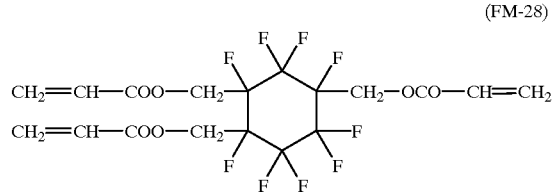

The polymer of the particles may comprise repeating units containing no fluorine atom. The repeating unit is obtained by polymerizing a monomer containing no fluorine atom. Examples of the monomers include olefins (e.g., ethylene, propylene, isoprene, vinyl chloride, vinylidene chloride, 6-hydroxy-1-hexene, cyclopentadiene, 4-pentenic acid, trimethylvinylsilane, trimethoxyvinylsilane), unsaturated carboxylic acids (e.g., acetic acid, methacrylic acid, itaconic acid, maleic acid), unsaturated carboxylic salts (e.g., sodium acrylate, ammonium methacrylate, potassium itaconate), unsaturated carboxylic esters (e.g., methyl 8-nonenoate, methyl acrylate, cyclohexyl acrylate, 2-ethylhexyl acrylate, 2-chloroethyl acrylate, benzyl acrylate, 2-cyanoethyl acrylate, methyl methacrylate, butyl methacrylate, 2-hydroxyethyl methacrylate, glycidyl methacrylate, glycerin monomethacrylate, 2-acetoxyethyl methacrylate, phenyl methacrylate, tetrahydrofurfuryl methacrylate, 2-methoxyethyl methacrylate, ω-methoxypolyethylene glycol (addition mol: 2 to 100) methacrylate, ω-hydroxypolyethylene glycol (addition mol: 2 to 100) methacrylate, ω-hydroxypolypropylene glycol (addition mol: 2 to 100) methacrylate, 3-N,N-dimethylaminopropyl methacrylate, chloro-3-N,N,N-trimethylammoniopropyl methacrylate, 2-carboxyethyl methacrylate, 3-sulfopropyl methacrylate, 4-oxysulfobutyl methacrylate, monobutyl maleate, dimethyl maleate, monomethyl itaconate, dibutyl itaconate, 3-trimethoxysilylpropyl methacrylate, allyl methacrylate, 2-isocyanatoethyl methacrylate), unsaturated amides (e.g., acrylamide, methacrylamide, N-methylacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetoacetoxyethyl)acrylamide, N-acryloylmorpholine, diacetoneacrylamide, itaconic diamide, N-methylmaleimide, 2-acrylamidomethyl propanesulfonate), unsaturated nitriles (e.g., acrylonitrile, methacrylonitrile), styrene, styrene derivatives (e.g., vinyl toluene, p-tert-butylstyrene, methyl vinylbenzoate, α-methylstyrene, p-chloromethylstyrene, vinylnaphthalene, p-hydroxymethylstyrene, sodium p-styrenesulfonate, potassium p-styrenesulfinate, p-aminomethylstyrene), vinyl ethers (e.g., methyl vinyl ether, butyl vinyl ether, methoxyethyl vinyl ether), vinyl esters (e.g., vinyl sulfonate, vinyl acetate, vinyl propionate, vinyl benzoate, vinyl salicylate, vinyl chloroacetate) and other unsaturated monomers (e.g., N-vinylimidazole, 4-vinylpyridine, N-vinylpyrrolidone).

A monomer having a hydrophilic group can be used to adjust the surface energy of the particles. Examples of the hydrophilic groups include carboxyl, a salt thereof, sulfo, a salt thereof, a partial sulfuric ester, a salt thereof, hydroxyl and polyoxyethylene.

The polymer of the particles may further comprise repeating units having a branch to be cross-linked to each other. The repeating unit is formed by polymerizing a monomer having two or more ethylenically unsaturated groups. Examples of the monomers include dienes (e.g., butadiene, pentadiene, 1,4-divinylcyclohexane), trienes (e.g., 1,2,5-trivinylcyclohexane), diacrylic, triacrylic or poly(meth) acrylic esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane tri(meth) acrylate, dipentaerythritol pentamethacrylate, dipentaerythritol hexaacrylate, 1,2,4-cyclohexane tetramethacrylate), styrene derivatives (e.g., 1,4-divinylbenzene, 2-acryloylethyl 4-vinylbenzoate), bis-acrylamides (e.g., methylene bis-acrylamide, diacryloylpiperazine) and bis-methacrylamides (e.g., methylene bismethacrylamide, dimethacryloylpiperazine).

The particle may have a core/shell structure. The core polymer preferably contains a relatively large amount of fluorine atoms to reduce the refractive index of the particle. The shell polymer preferably has a function of adhering the particle to a binder or an undercoated layer. The shell polymer preferably has a functional group such as acryloyl, epoxy or isocyanato.

Examples of the particles are shown below.

FP-1: FM-1/methyl methacrylate/divinylbenzene copolymer (weight ratio: 25/60/15, average particle size: 43 nm)

FP-2: FM-3/FM-5/2-hydroxyethyl methacrylate/divinylbenzene copolymer (weight ratio: 60/10/5/20, average particle size: 38 nm)

FP-3: FM-4/2-hydroxyethyl methacrylate/divinylbenzene copolymer (weight ratio: 75/5/20, average particle size: 72 nm)

FP-4: FM-7/glycidyl methacrylate/ethylene glycol dimethacrylate copolymer (weight ratio: 70/10/20, average particle size: 88 nm)

FP-5: FM-9/acrylic acid/trivinylcyclohexane copolymer (weight ratio: 75/5/20, average particle size: 69 nm)

FP-6: FM-12/methyl methacrylate/glycidyl acrylate/trivinylcyclohexane copolymer (weight ratio: 65/10/5/20, average particle size: 69 nm)

FP-7: Tetrafluoroethylene/FM-4 (weight ratio: 75/25, average particle size: 120 nm)

FP-8: FM-4/methyl methacrylate/3-trimethoxysilylpropyl methacrylate/divinylbenzene copolymer (weight ratio: 70/10/5/15, average particle size: 63 nm)

FP-9: FM-4/2-hydroxyethyl methacrylate/divinylbenzene copolymer (weight ratio: 80/5/15, average particle size: 55 nm)

FP-10: FM-4/2-hydroxyethyl methacrylate/FM-24 copolymer (weight ratio: 80/5/15, average particle size: 48 nm)

FP-11: FM-8/2-hydroxyethyl methacrylate/FM-24 copolymer (weight ratio: 80/5/15, average particle size: 48 nm)

FP-12: FM-24/2-hydroxyethyl methacrylate copolymer (weight ratio: 95/5, average particle size: 79 nm)

FP-13: FM-7/FM-26 copolymer (weight ratio: 80/20, average particle size: 66 nm)

FP-14: FM-4/polyethylene glycol (average addition mol: 8) monomethacrylate/divinylbenzene copolymer (weight ratio: 75/5/20, average particle size: 62 nm)

FP-15: FM-4/polypropylene glycol (average addition mol: 12) monomethacrylate/divinylbenzene copolymer (weight ratio: 75/5/20, average particle size: 102 nm)

FP-16: FM-10/FM-26/(ω-methoxypolyethylene glycol (average addition mol: 23) monomethacrylate copolymer (weight ratio: 70/20/10, average particle size: 86 nm)

FP-17: FM-4/2-hydroxyethyl methacrylate/sodium methacrylate/divinyl benzene copolymer (weight ratio: 72/4/4/20, average particle size: 72 nm)

A synthesis example of the particles (d) is shown below. The other particles can be synthesized according to a similar manner.

SYNTHESIS EXAMPLE 2

(Synthesis of FP-3)

In a three neck flask of 2 liters having a cooling tube and a stirring device, a solution of 20 g of sodium dodecylbenzenesulfate in 1,350 ml of distilled water was placed. Further, a mixture of 150 g (0.63 mol) of hexafluoroisopropyl methacrylate, 10 g (0.076 mol) of 2-hydroxyethyl methacrylate and 40 g (0.31 mol) of divinylbenzene was added to the flask. The mixture was stirred at 200 rpm in a stream of nitrogen. After the flask was heated to 75° C., 40 ml of 8 wt. % aqueous solution of sodium persulfate was added to the mixture. The polymerization reaction was conducted for 2 hours. Further, 40 ml of 8 wt. % aqueous solution of sodium persulfate was added to the mixture, and the reaction was conducted for 2 hour. The reaction mixture was cooled to the room temperature, and dialyzed through a cellulose membrane (fractional molecular weight: 10,000) to remove the excess surface active agent and inorganic salts from the solution. The solution was filtered off to remove insoluble matters. Thus 2,020 g of white aqueous solution was obtained. The solution was in the form of a latex having the solid content of 9.9 wt. %. The average particle size of the latex was 72 rm. The particle size was measured according to a dynamic light scattering method by using a particle size analyzer (N4, Coaltar).

The content of the particles (d) is preferably in the range of 2 to 300 weight parts based on 100 weight parts of the organosilane (a-0).

Metal-chelate compound (e)

The composition for the low refractive index layer can further comprise (e) a metal-chelate compound. The metal-chelate compound comprises a central metal selected from the group consisting of Zr, Ti or Al, an alcohol ligand and a diketone ligand. The alcohol ligand is represented by the formula of $R^3OH$ in which $R^3$ is an alkyl group having 1 to 6 carbon atoms. The diketone ligand is represented by the formula of $R^4COCH_2COR^5$ in which $R^4$ is an alkyl group having 1 to 6 carbon atoms, and $R^5$ is an alkyl group having 1 to 5 carbon atoms or an alkoxy group having 1 to 16 carbon atoms The metal-chelate compound is preferably a compound of $Zr(OR^3)_p(R^4COCHCOR^5)_{4-p}$, $Ti(OR^3)_q(R^4COCHCOR^5)_{4-q}$ or $Al(OR^3)_r(R^4COCHCOR^5)_{3-r}$. The component (e) has a function of accelerating a condensation reaction between the components (a) or (b) and the vinyl resin (c) to form a copolymer.

In the formulas, each of $R^3$ and $R^4$ independently is an alkyl group having 1 to 6 carbon atoms. Examples of the alkyl groups include ethyl, n-propyl, i-propyl, n-butyl, sec-butyl, t-butyl and n-pentyl. In the formula, $R^5$ is an alkyl group having 1 to 5 carbon atoms or an alkoxy group having 1 to 16 carbon atoms. Examples of the alkyl groups are the same as those of $R^3$ and $R^4$. Examples of the alkoxy group include methoxy, ethoxy, n-propoxy, i-propoxy, n-butoxy, sec-butoxy, t-butoxy, lauryloxy and stearyloxy. In the formulas, each of p and q independently is 0, 1, 2 or 3, and r is 0, 1 or 2.

Examples of the metal-chelate compounds (e) include zirconium chelate compound such as tri-n-butoxyethylacetoacetate zirconium, di-n-butoxy bis (ethylacetoacetate) zirconium, n-butoxy tris (ethylacetoacetate) zirconium, tetrakis(n-propylacetoacetate) zirconium, tetrakis(acetylacetoacetate) zirconium and tetrakis(ethylacetoacetate) zirconium; titanium chelate compound such as diisopropoxy-bis (ethylacetoacetate) titanium, diisopropoxy-bis (acetylacetoacetate) titanium, and diisopropoxy-bis (acetylacetonato) titanium; and aluminum chelate compound such as di-iso-propoxy ethylacetoacetate aluminum, diiso-propoxyacetylacetonato aluminum, isopropoxy bis(ethylacetoacetate) aluminum, isopropoxy bis (acetylacetonato) aluminum, tris(ethylacetoacetate) aluminum, tris(acetylacetonato) aluminum, and monoacetylacetonato bis(ethylacetoacetate) aluminum. Preferred are tri-n-butoxyethylacetoacetate zirconium, diisopropoxy bis (acetylacetonato) titanium, diisopropoxy ethylacetoacetate aluminum and tris(ethylacetoacetate) aluminum. Two or more metal-chelate compounds (e) can be used in combination. A partial hydrolysis product of the metal-chelate compound can also be used as the component (e). The content of the metal-chelate compound (e) in the composition is preferably in the range of 0.01 to 50 weight parts, more preferably 0.1 to 50 weight parts, and most preferably 0.5 to 10 weight parts, based on 100 weight parts of the organosilane (a-0). If the content is less than 0.01 weight parts, the copolymer is insufficiently formed and the formed film has a problem of poor durability. If the content is more 50 weight parts, the prepared composition is instable and the formed film is liable to crack.

Organic solvent (f)

The composition for the low refractive index layer can further comprise (f) an organic solvent. The components (a) to (d) are homogeneously mixed in the solvent (f) so that the composition may be suitable for coating procedure. Further, the organic solvent of the component (f) enhances dispersion stability and storage stability of the composition. The organic solvent (f) is selected from the group consisting of an alcohol, an aromatic hydrocarbon, an ether, a ketone and an ester.

A monohydric alcohol or a dihydric alcohol is preferably used as the organic solvent (f). A monohydric alcohol is more preferred, a monohydric alcohol having 1 to 8 carbon atoms is most preferred. Examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, and ethylene glycol acetate monoethyl ether.

Examples of the aromatic hydrocarbons include benzene, toluene and xylene. Examples of the ethers include tetrahydrofuran and dioxane. Examples of the ketones include acetone, methyl ethyl ketone, methyl isobutyl ketone and diisobutyl ketone. Examples of the esters include ethyl acetate, propyl acetate, butyl acetate and propylene carbonate.

Two or more organic solvents (f) can be used in combination. The amount of the solvent (f) is not particularly restricted, and is determined to adjust the total solid content in the composition.

Ketone (g)

The composition for the low refractive index layer can further comprise β-diketone or β-ketoester (g), which is represented by the formula of $R^4COCH_2COR^5$. The component (g) has a function of improving stability of the composition. In the composition, the component (g) reacts with the metal atom of the chelate compound (component (e)) to form a coordination compound so that the chelate compound (e) may not excessively accelerate the condensation reaction between the component (a) or (b) and the component (c). Therefore, the component (g) can improve the storage stability of the composition.

In the formula, each of $R^4$ and $R^5$ has the same meanings as described in the chelate compound of the component (e).

Examples of the β-diketone and β-ketoester (f) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4- hexane-dione, 2,4-heptane-dione, 3,5-heptane-dione, 2,4-octane-dione, 2,4-nonane-dione, and 5-methyl-hexane-dione. Preferred are methyl acetoacetate and acetylacetone, and particularly preferred is acetylacetone. Two or more β-diketones or β-ketoesters (g) can be used in combination. The content of the β-diketone and/or β-ketoester (g) is preferably in the range of 2 to 20 mol, and more preferably in the range of 3 to 20 mol, based on 1 mol of the metal-chelate compound (e). If the content is less than 2 mol, the formed composition has a problem of poor storage stability.

Water (h)

The composition for the low refractive index layer can further comprise water (h), which functions at the hydrolysis or condensation reaction of the organosilane (a-0) or diorganosilane (b-0). The content of water (h) is usually in the range of 1.2 to 3.0 mol (preferably 1.3 to 2.0 mol) based 1 mol of organosilane (a-0), and in the range of 0.8 to 2.0 mol (preferably 0.9 to 1.5 mol) based on 1 mol of diorganosilane (b-0).

Filler (i)

The composition for the low refractive index layer can further comprise a filler (i). The filler can be used for the various purposes such as coloring the film, thickening the film, absorbing ultraviolet light, enhancing durability and improving heat resistance. A water-insoluble pigment (e.g., organic pigment, inorganic pigment) and other substances such as metals, alloys, and their compounds (e.g., oxide, hydroxide, carbide, nitride and sulfide) in the form of particles, fibers or flakes can be used as the filler (i). Examples of the filler (i) include particles, fibers and flakes of iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chrome green, cobalt green, viridian, Guignet's green, cobaltchrome green, Scheele's green, manganese green, pigment green, ultramarine, Prussian blue, rock ultramarine, cobalt blue, cerulean blue, copper borate, molybdenum blue, copper sulfite, cobalt violet, mars violet, manganese violet, pigment violet, lead suboxide, calcium plumbate, zinc yellow, lead sulfide, chrome yellow, yellow earth, cadmium yellow, strontium yellow, titanium yellow, litharge, pigment yellow, copper suboxide, cadmium red, selenium red, Chrome Vermilion, red iron oxide, zinc white, antimony white, alkaline lead sulfate, titanium white, lithopone, lead silicate, zirconium oxide, tungsten white, lead zinc flower, Bantison White, lead phthalate, manganese white, lead sulfate, graphite, Bone Black, diamond black, Thermatomic Black, vegetable black, potassium titanate whisker and molybdenum disulfide.

The mean grain size or the mean length of the filler (i) is usually in the range of 50 to 50,000 nm, preferably 100 to 5,000 nm. The content of the filler (i) is in the range of 10 to 300 weight parts based on 100 weight parts of the total solid content of the components (a) to (g).

Other additives for composition

The solid content of the composition is preferably not more than 50 wt. %. In the case that a film substrate is soaked in the composition, the solid content is usually in the range of 5 to 30 wt. %. In the case that the composition is used for forming a thick film or for dispersing the filler (i), the solid content is usually in the range of 20 to 50 wt. %, preferably 25 to 40 wt. %. If the content is above 50 wt. %, the composition has poor storage stability.

A colloidal silica can be added to the composition to improve the hardness of the resultant film. The colloidal silica may be a water-dispersion type or an organic solvent (e.g., methanol, isopropyl alcohol)-dispersion type.

A hardening promoter may be used to harden the composition rapidly. In the case that the composition is hardened at low temperature, it is preferred to use the hardening promoter. Examples of the hardening promoter include alkaline metal salt of naphthenate, octylate, nitrute, sulfite, aluminate, or carbonate; alkaline compound such as sodium hydroxide and potassium hydroxide; acidic compound such as alkyltitanic acid, phosphoric acid, p-toluenesulfonic acid and phthalic acid; amine compound such as ethylene diamine, hexane diamine, diethylene triamine, triethylene tetramine, tetraethylene pentamine, piperidine, piperazine, methaphenylene diamine, ethanolamine, triethylamine, various modified amines used as hardening agent for epoxy resin, γ-aminopropyltriethoxysilane, γ-(2-aminoethyl)-aminopropyltrimethoxysilane, 7-(2-aminoethyl)-aminopropylmethyldimethoxysilane, and γ-anilinopropyltrimethoxysilane; carboxylic organotin compound such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, and $Sn(OCOCC_8H_{17})_2$; mercaptide organotin compound such as $(C_4H_9)_2Sn(SCH_2COOC_8H_{17})_2$, $(C_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_{12}H_{25})_2$, the following mercaptido organotin compound and the following sulfide organotin compounds.

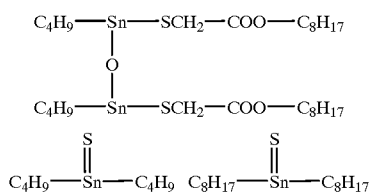

-continued

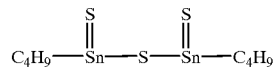

The other organotin compounds such as $(C_4H_9)_2SnO$, $(C_8H_{17})_2SnO$, a reaction product between organotin oxide (e.g., $(C_4H_9)_2SnO$, $(C_8H_{17})_2SnO$) and ester (e.g., ethyl silicate, dimethyl maleate, diethyl maleate, dioctyl phthalate) can also be used as the hardening promoter. The content of the hardening promoter in the composition is in the range of 0.1 to 15 weight parts, preferably 0.5 to 10 weight parts, based on 100 weight parts of the solid content of the composition.

The composition may further contain known additives such as dehydrating agents (e.g., methyl orthoformate, methyl orthoacetate, tetraethoxysilane), various surface active agents, silane coupling agents other than the above, titanium coupling agents, dyes, dispersing agents, thickening agents, and leveling agents.

Further, the composition may contain an auxiliary organic solvent other than the above-described organic solvent (f). There is no particular restriction for the auxiliary organic solvent, unless precipitate is deposited when the components (a) to (e) are mixed. As the auxiliary solvent, solvents generally used for coating are used (e.g., aliphatic hydrocarbons, aromatic hydrocarbons, halogenated hydrocarbons, ketones, esters, ethers, ketone ethers, ketone esters, ester ethers). Examples of the auxiliary solvent include benzene, toluene, xylene, methyl acetate, ethyl acetate, propyl acetate, butyl acetate, and isoamyl acetate. The auxiliary solvent is used in an amount of not less than 100 weight parts per 100 weight parts of the composition.

The composition is prepared by the steps of making an intermediate composition comprising the components (a) to (f), and then adding the component (g) into the intermediate composition. Preferred examples of the process are given below.

Process (1)

First, a solution comprising an organosilane (a-0) of the component (a), a diorganosilane (b-0) of the component (b), a silyl-containing vinyl resin (c), a metal-chelate compound (e) and an organic solvent (f) is prepared. To the solution, water is added in an amount of 1.2 to 3.0 mol per 1 mol of the organosilane (a-0), and another water is added in an amount of 0.8 to 2.0 mol per 1 mol of the diorganosilane (b-0) to promote hydrolysis and condensation. Thus, an intermediate composition comprising the components (a) to (f) is prepared. A β-diketone or β-ketoester (g) is then added to the intermediate composition.

Process (2)

First, a solution comprising an organosilane (a-0) of the component (a), a diorganosilane (b-0) of the component (b) and an organic solvent (f) is prepared. To the solution, water is added in an amount of 1.2 to 3.0 mol per 1 mol of the organosilane (a-0), and another water is added in an amount of 0.8 to 2.0 mol per 1 mol of the diorganosilane (b-0) to promote hydrolysis and condensation. After that, a silyl-containing vinyl resin (c) and a metal-chelate compound (e) are added into the reaction mixture, and then the condensation is further advanced to prepare an intermediate composition comprising the components (a) to (f). Next, the component (g) is added to the intermediate composition.

Process (3)

First, a solution comprising an organosilane (a-0) of the component (a), a diorganosilane (b-0) of the component (b), a metal-chelate compound (e) and an organic solvent (f) is prepared. To the solution, water is added in an amount of 1.2 to 3.0 mol per 1 mol of the organosilane (a-0), and another water is added in an amount of 0.8 to 2.0 mol per 1 mol of the diorganosilane (b-0) to promote hydrolysis and condensation. After that, a silyl-containing vinyl resin (d) is added into the reaction mixture, and then the condensation is further advanced to prepare an intermediate composition comprising the components (a) to (f). Next, the component (g) is added to the intermediate composition.

For forming a low refractive index layer, the composition is applied on a transparent film support or a high (or middle) refractive index layer (described below) by known coating methods such as curtain flow coating, dip coating, spin coating and roll coating. The applied composition is then dried at room temperature or at a temperature of 30 to 200° C. for 10 minutes to 100 hours to form the low refractive index layer.

It is preferred that the low refractive index layer substantially does not contain micro voids. The volume of the micro voids in the low refractive index layer is preferably not larger than 5 volume %, more preferably not larger than 3 volume %, and most preferably not larger than 1 volume %.

Anti-reflection film

The anti-reflection film of the invention comprises two or more layers in which the low refractive index layer (1) is provided on a high refractive index layer (2) having a refractive index higher than the index of the low refractive index layer (1). The high refractive index layer (2) preferably has a refractive index of more than 1.70, more preferably more than 1.75. The layers are preferably provided on a support, and more preferably on a transparent film support.

It is particularly preferred for the anti-reflection film to comprise a low refractive index layer (1), a high refractive index layer (2), a middle refractive index layer (3) and an undercoating layer (4). The low refractive index layer (1) is provided on a high refractive index layer (2) having a refractive index higher than the index of the low refractive index layer (1). The high refractive index layer (2) preferably has a refractive index of more than 1.70, more preferably more than 1.75. The high refractive index layer (2) is provided between the low refractive index layer (1) and the middle refractive index layer (3) having a refractive index between the index of the high refractive index layer (2) and the refractive index of the undercoating layer (4). The middle refractive index layer (3) is provided between the high refractive index layer (2) and the undercoating layer (4).

On the middle refractive index layer (3), another layer (4) such as subbing layer is further overlaid. The middle refractive index layer (3) has a refractive index between the index of the low refractive index layer of the layer (4) and the high refractive index layer (2). The layers are preferably provided on a support, more preferably on a transparent film support.

FIG. 1 shows a typical example of the anti-reflection film of the invention. As is shown in FIG. 1, a high refractive index layer (12) is provided on a transparent film support (13), and a low refractive index layer (11) is formed on the high refractive index layer (12). Increase of the number of the layers generally enlarges a wavelength region of light for which the film can be applied.

The high refractive index layer (12) and the low refractive index layer (11) generally satisfy the following formulas:

(High refractive index layer)

$$\frac{m}{4}\lambda \times 0.7 < n_1 d_1 < \frac{m}{4}\lambda \times 1.3$$

(Low refractive index layer)

$$\frac{n}{4}\lambda \times 0.7 < n_2 d_2 < \frac{n}{4}\lambda \times 1.3$$

in which m is a natural number (generally 1, 2 or 3), n1 is the refractive index of the high refractive index layer, d1 is the thickness (nm) of the high refractive index layer, n is a positive odd number (generally 1), n2 is the refractive index of the low refractive index layer, and d2 is the thickness (nm) of the low refractive index layer. The refractive index n1 (of the high refractive index layer) is generally higher than that of the transparent film support by at least 0.05. The refractive index n2 (of the low refractive index layer) is generally lower than that of the high refractive index layer by at least 0.1, and is lower than that of the transparent film support by at least 0.05. The refractive index n1 (of the high refractive index layer) is generally in the range of 1.7 to 2.2. The above-mentioned formulas are described in Japanese Patent Provisional Publication No. 59(1984)-50401.

Figure 2:
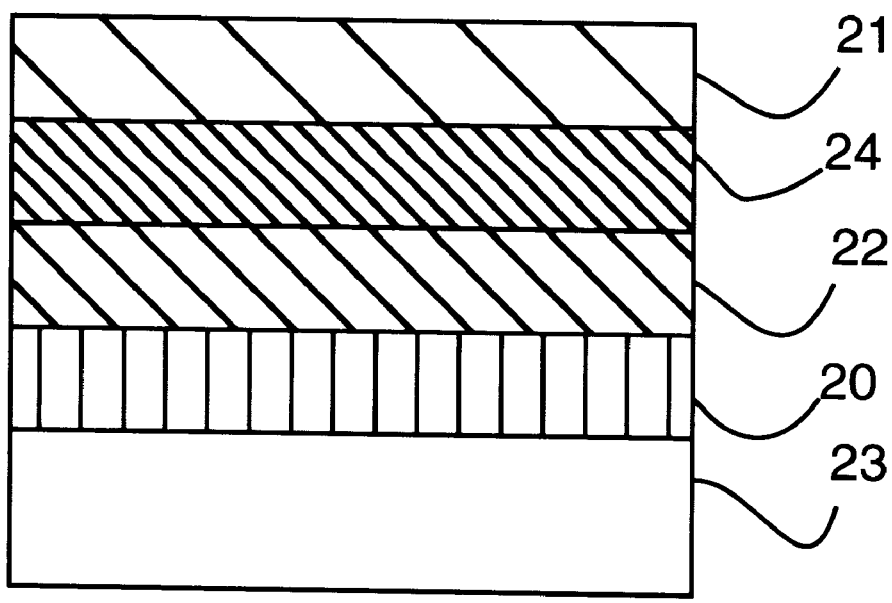
FIG. 2 is a sectional view schematically illustrating another layered structure of an anti-reflection film.

FIG. 2 shows another typical example of the anti-reflection film of the invention. As is shown in FIG. 2, an undercoating layer (20) is provided on a transparent film support (23). A middle refractive index layer (22) is provided on the undercoating layer (20). A high refractive index layer (24) is formed on the middle refractive index layer (22). A low refractive index layer (21) is provided on the high refractive index layer (24). The middle refractive index layer (22) has a refractive index between the index of the undercoating layer (20) and the index of the high refractive index layer (24). The anti-reflection film of FIG. 2 has a wavelength region wider than that of the film of FIG. 1.

In the anti-reflection film having the three layers of low, middle and high refractive indexes, the layers generally satisfy the following formulas:

(Middle refractive index layer)

$$\frac{h}{4}\lambda \times 0.7 < n_3 d_3 < \frac{h}{4}\lambda \times 1.3$$

(High refractive index layer)

$$\frac{k}{4}\lambda \times 0.7 < n_4 d_4 < \frac{k}{4}\lambda \times 1.3$$

(Low refractive index layer)

$$\frac{j}{4}\lambda \times 0.7 < n_5 d_5 < \frac{j}{4}\lambda \times 1.3$$

in which h is a natural number (generally 1, 2 or 3), n3 is the refractive index of the middle refractive index layer, d3 is the thickness (nm) of the middle refractive index layer, k is a natural number (generally 1, 2 or 3), n4 is the refractive index of the high refractive index layer, d4 is the thickness (nm) of the high refractive index layer, j is a positive odd number (generally 1), n5 is the refractive index of the low refractive index layer, and d5 is the thickness (nm) of the low refractive index layer. The refractive index n3 (of the middle refractive index layer) is generally in the range of 1.5 to 1.7, and the refractive index n4 (of the high refractive index layer) is generally in the range of 1.7 to 2.2.

The anti-reflection film of the invention generally comprises a support on which the layers are provided. The support is usually a transparent film support. Examples of materials for the transparent film support include cellulose derivatives (e.g., diacetylcellulose, triacetylcellulose (TAC), propionylcellulose, butyrylcellulose, acetylpropionylcellulose, nitrocellulose), polyamide, polycarbonate (described in U.S. Pat. No. 3,023,101), polyester (e.g., polyethylene terephthalate, polyethylene naphthalate, polybutylene terephthalate, poly-1,4-cyclohexanedimethylene terephthalate, polyethylene 1,2-diphenoxyethane-4,4'-dicarboxylate, a polyester described in Japanese Patent Publication No. 48(1973)-40414), polystyrene, polyolefin (e.g., polyethylene, polypropylene, polymethylpentene), polymethyl methacrylate, syndiotactic polystyrene, polystyrene, polyethersulfone, polyetherketone, polyetherimide, and polyoxyethylene. Preferred are triacetylcellulose (TAC), polycarbonate and polyethylene terephthalate. The transparent film support preferably has a refractive index of 1.40 to 1.60.

The anti-reflection film can comprise not only a low refractive index layer but also a layer having a refractive index higher than that of the low refractive index layer (i.e., a high refractive index layer or a middle refractive index layer). Examples of organic materials for the layer having a higher refractive index include thermoplastic resin (e.g., polystyrene; polystyrene copolymer; polycarbonate; polymer having aromatic ring, heterocyclic ring or alicyclic group; and polymer having halogen group other than fluorine), thermosetting resin composition (e.g., resin composition having a hardening agent of melamine resin, phenol resin or epoxy resin), urethane forming composition (e.g., composition of alicyclic or aromatic isocyanate and polyol), and radical polymerizable composition (e.g., radical polymerizable composition modified by introducing double bonds into the above compound (polymer) or composition having prepolymer). Materials having high film-formability are preferably employed.

The layer having a higher refractive index may contain inorganic fine particles dispersed in an organic material. In that case, the organic material may have a refractive index lower than that of a material singly employed because the inorganic fine particles have a high refractive index. As the organic materials, various transparent materials can be used to disperse inorganic fine particles to obtain a stable dispersion. Examples of the organic material include the above-described organic materials, vinyl copolymer including acrylic polymer, polyester, alkyd resin, cellulosic polymer, urethane resin, and various hardening agents (composition containing hardening functional groups) hardening the above.

A silicon compound substituted with organic groups may be further contained in the layer having a higher refractive index. The usable silicon compound is a compound or a hydrolysis product of $R^{51}mR^{52}nSiZ_{(4-m-n)}$ in which each of $R^{51}$ and $R^{52}$ independently is an alkyl group, an alkenyl group (e.g., allyl), an aryl group or a hydrocarbon group substituted with a halogen atom, epoxy, amino, mercapto or cyano; Z is a hydrolyzable group selected from the group consisting of an alkoxy group, an alkoxyalkoxy group, a halogen atom and an acyloxy group; and each m and n is 0, 1 or 2 and m+n is 1 or 2.

As materials for the inorganic fine particles, metal oxides (e.g., oxides of aluminum, titanium, zirconium and antimony) are employable. These materials are commercially available in the form of powder or colloid dispersed in water or other solvents. The materials are mixed and dispersed in the above organic material or organic silicon compound.

Further, a film forming inorganic material which can be dispersed in a solvent or which is liquid can be also employed as a material for the layer having a higher refractive index. Examples of the film forming inorganic material include alkoxides of various metals, coordination compound (e.g., chelate compound), and active inorganic polymer. Preferred examples include metal alcoholate compound (e.g., titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide, and zirconium tetra-tert-butoxide); chelate compound (e.g., diisopropoxytitanium bis (acetylacetonate), dibutoxytitanium bis(acetylacetonate), diethoxytitanium bis(acetylacetonate), bis(acetylacetone zirconium), aluminum acetylacetonate, aluminum di-n-butoxide monoethylacetoacetate, aluminum di-i-propoxide monomethylacetoacetate, and tri-n-butoxide zirconium monoethylacetoacetate); and active inorganic polymer mainly containing carbon-zirconyl ammonium or zirconium. Further, various alkylsilicates (or their hydrolysis products) and fine particles of silica (particularly, colloidal silica gel) are also employable in combination with the above compounds though they have low refractive indexes.

The anti-reflection film of the invention may have an anti-glare function (by which incident light is scattered so as not to reflect a scene around the film). The anti-glare function can be given, for example, by the steps of providing many fine concaves and convexes on a transparent film support, and then forming the anti-reflection film (i.e., the low refractive index layer and other layers) thereon. In the above steps, the fine concaves and convexes are provided, for example, by coating the transparent film support with a layer containing inorganic or organic fine particles. Besides the above, the anti-glare function may be also given, for example, by the steps of adding the fine particles having a grain size of 50 nm to 2 μm into a coating liquid for forming the low refractive index layer in an amount of 0.1 to 50 wt. %, and then applying the liquid to form the low refractive index layer containing the particles. The fine concaves and convexes are thus provided on the top surface of the film in the latter case, while they are in the middle of the film in the former. The anti-reflection film having the anti-glare function generally has a haze value of 3 to 30%.

The anti-reflection film of the invention (preferably having the anti-glare function) can be employed for various display devices such as liquid crystal display (LCD), plasma display (PDP), electroluminescence display (ELD), and cathode-ray tube (CRT). A display device provided with the anti-reflection film of the invention has remarkably improved visibility because the film effectively lowers reflection of incident light.

The display device provided with the anti-reflection film of the invention is, for example, a liquid crystal display (LCD) which comprises:

a liquid crystal cell comprising a pair of substrates having transparent electrode, and nematic liquid crystal enclosed between them, and polarizers provided on both top and bottom faces of the cell; wherein an anti-reflection film is provided on at least one of the polarizers.

The anti-reflection film may have auxiliary layers (e.g., a hard coating layer, a moisture proof layer, an antistatic layer). Examples of materials for the hard coating layer include silica materials and polymers and/or oligomers and/or monomers of acrylic, urethane or epoxy compounds (e.g., UV curable resin).

EXAMPLE 1

(1) Preparation of silyl-containing vinyl resin

In a reactor equipped with reflux condenser and stirrer, 90 weight parts of methyl methacrylate, 40 weight parts of n-butyl acrylate, 20 weight parts of γ-methacryloyloxypropyltrimethoxysilane and 130 weight parts of xylene were placed and mixed. Independently, 4 weight parts of azobisisovaleronitrile was dissolved in 10 weight parts of xylene, and then dropwise added to the above mixture with stirring at 80° C. for 30 minutes. The resulting mixture was then allowed to react for 5 hours at 80° C. to prepare solution containing silyl-containing vinyl resin (c-2). The number average molecular weight of the prepared silyl-containing vinyl resin (c-2) was determined by means of gel-permeation chromatography, and found 12,000 in terms of polystyrene. This means that the prepared polymer has six silyl groups per one molecule on average.

(2) Preparation of the composition for a low refractive index layer

In a reactor equipped with reflux condenser and stirrer, 100 weight parts of methyltrimethoxysilane (a-01), 50 weight parts of dimethyldimethoxysilane (b-01), a vinyl resin (Kaneka-Zemrack, Kanegafuchi Kagaku Kogyo Kabushiki Kaisha, solid content: 50 wt. %) (c-1), 20 weight parts (0.07 mol) of diisopropoxy aluminum ethylacetoacetate (e-1) and 40 weight parts of i-propanol (f-1) were placed and mixed. To the mixture, 30 weight parts of ion exchanged water was added, and then the mixture was allowed to react for 4 hours at 60° C. After the mixture was cooled to room temperature, 20 weight parts (0.2 mol) of acetylacetone (g-1) was added to prepare a titled composition A. Further, each of the compositions shown in Table 1 (compositions B to E, X and Y) was also prepared in the same manner as described above.

TABLE 1

| Composition | A | B | C | D | E | X | Y |
|---|---|---|---|---|---|---|---|
| Initially added component (weight part) | | | | | | | |
| (a-01) | 100 | 90 | 100 | 100 | 100 | 100 | 100 |
| (a-02) | — | 10 | — | — | — | — | — |
| (b-01) | 50 | 30 | 10 | 60 | — | 50 | 50 |
| (c-1) | 50 | 60 | — | 100 | 20 | — | 50 |
| (c-2) | — | — | 50 | — | — | — | — |
| (e-1) | 20 | — | — | — | — | 20 | — |
| (e-2) | — | — | 10 | — | 4 | — | — |
| (e-3) | — | 10 | — | — | — | — | — |
| (e-4) | — | — | — | 10 | — | — | — |
| Mol of (e) | 0.07 | 0.027 | 0.024 | 0.023 | 0.01 | 0.07 | — |
| (f-1) | 40 | 31 | 30 | 49 | 26 | 32 | 42 |
| (f-2) | — | 20 | — | 40 | — | — | — |
| (h) | 30 | 25 | 23 | 29 | 20 | 23 | 30 |
| Reaction conditions | | | | | | | |
| Temp. (° C.) | 60 | 60 | 60 | 60 | 60 | 60 | — |
| Time (hour) | 4 | 3 | 5 | 3 | 2.5 | 4 | — |
| Supplemental | | | | | | | |

TABLE 1-continued

| Composition | A | B | C | D | E | X | Y |
|---|---|---|---|---|---|---|---|
| component (weight part) added after reaction | | | | | | | |
| (g-1) | 20 | — | 7 | 12 | 10 | 20 | 20 |
| (g-2) | — | 16 | — | — | — | — | — |
| Mol of (g) | 0.2 | 0.12 | 0.07 | 0.12 | 0.01 | 0.2 | 0.2 |
| Total solid content (wt. %) | 35 | 35 | 36 | 35 | 35 | 35 | 35 |

(Remark)
(a-01): Methyltrimethoxysilane
(a-02): γ-Glycidoxypropyltrimethoxysilane
(b-01): Dimethyldimethoxysilane
(c-1): Kaneka-Zemrack
(c-2): Solution of silyl-containing vinyl resin
(e-1): Diisopropoxyaluminum ethylacetoacetate
(e-2): Aluminum tris(ethyl)acetoacetate
(e-3): Diisopropoxytitanium bis(acetylacetonato)
(e-4): Tri-n-butoxyzirconium ethylacetoacetate
(f-1): Isopropyl alcohol
(f-2): Ethylene glycol monobutyl ether
(h): Ion exchanged water
(g-1): Acetylacetone
(g-2): Ethyl acetoacetate (3) Formation of the first layer (hard coating layer)

In 50 weight parts of methyl ethyl ketone, 25 weight parts of dipentaerythritol penta/hexacrylate (DPHA, Nippon Kayaku Co., Ltd.), 25 weight parts of urethane acrylate oligomer (UV-6300B, Nippon Synthetic Chemical Industry Co., Ltd.), 2 weight parts of photopolymerization initiator (Irgacure 907, Ciba-Geigy) and 0.5 weight parts of sensitizer (Kayacure DETX, Nippon Kayaku Co., Ltd.) were dissolved to prepare a coating solution. The solution was applied onto a triacetylcellulose (TAC) film (thickness: 90 μm) by means of wire bar, and then the applied solution was exposed to UV light to form a hard coat layer (refractive index: 1.53, thickness: 5 μm).

(4) Formation of the second layer (middle refractive index layer)

In a binder of polymethyl methacrylate (refractive index: 1.48), $TiO_2$ fine particles were dispersed to prepare a coating liquid (solid content: 2 wt. %, weight ratio of $TiO_2$/binder: 22/78). The liquid was applied onto the first layer by means of wire bar, and then dried at 100° C. to from a middle refractive index layer (refractive index: 1.62, thickness: 78 nm).

(5) Formation of the third layer (high refractive index layer)

In a binder of polymethyl methacrylate (refractive index: 1.48), $TiO_2$ fine particles were dispersed to prepare a coating liquid (solid content: 2 wt. %, weight ratio of $TiO_2$/binder: 68/32). The liquid was applied onto the second layer by means of wire bar, and then dried at 100° C. to from a high refractive index layer (refractive index: 2.00, thickness: 127 nm)

(6) Formation of the fourth layer (low refractive index layer)

Each of the compositions shown in Table 1 was applied onto the third layer by means of wire bar, and then dried at 100° C. for 1 hour to from a low refractive index layer (refractive index: 1.3 to 1.5, thickness: 93 nm).

(7) Evaluation of the film

With respect to each film of the compositions A to E, X and Y, the reflectance (average reflectance in the wavelength region of 400 to 800 nm) and the film strength were measured. The film strength was evaluated by the steps of rubbing the sample with each of a finger, tissue paper, an eraser and a fingernail, and then observing whether the rubbed surface was injured or not. The results were shown in Table 2. In Table 2, the numbers on the line of the strength mean the film strength defined as follows:

0: injured with a finger,
1: injured with tissue paper,
2: injured with an eraser,
3: injured with a fingernail, and
4: not injured with any of the above.

TABLE 2

| Composition | A | B | C | D | E | X | Y |
|---|---|---|---|---|---|---|---|
| Reflectance | 0.5 | 0.5 | 0.3 | 0.5 | 0.4 | 1.9 | 0.6 |
| Strength | 4 | 4 | 4 | 4 | 4 | 3 | 1 |

(8) Preparation of a display device provided with the anti-reflection film

The anti-reflection film was provided on the surface of the liquid crystal display of a personal computer (PC9821NS/340W, Nippon Electric Co., Ltd.) to prepare a sample display device. The reflection on the surface of each sample was observed, and found that the sample provided with the film of the invention exhibited excellent visibility.

EXAMPLE 2

Anti-reflection films were prepared and evaluated in the same manner as in Example 1, except that the composition was changed as is shown in Table 3. The particles (d) shown in Table 3 were used in the form of a dispersion (solid content: 5 wt. %), and added to the composition after the reaction. Further, the refractive index of the low refractive index layer was measured. The results are set forth in Table 4.

The anti-reflection film was provided on the surface of the liquid crystal display of a personal computer (PC9821NS/340W, Nippon Electric Co., Ltd.) to prepare a sample display device. The reflection on the surface of each sample was observed, and found that the sample provided with the film of the invention exhibited excellent visibility.

TABLE 3

| Composition | F | G | H | I | J | K | U | V | W |
|---|---|---|---|---|---|---|---|---|---|
| Initially added component (weight part) | | | | | | | | | |
| (a-01) | 100 | 90 | 100 | 100 | 100 | 100 | 100 | 100 | 100 |
| (a-02) | — | 10 | — | — | — | — | — | — | — |
| (b-01) | 50 | 30 | 10 | 60 | — | 50 | 50 | 50 | 50 |
| (c-1) | 50 | 60 | — | — | — | 50 | — | 50 | 50 |
| (c-2) | — | — | 50 | 100 | 20 | — | — | — | — |
| (e-1) | 20 | — | — | — | — | 20 | 20 | — | 20 |
| (e-2) | — | — | 1o | — | 4 | — | — | — | — |
| (e-3) | — | 10 | — | — | — | — | — | — | — |
| (e-4) | — | — | — | 10 | — | — | — | — | — |
| Mol of (e) | 0.07 | 0.027 | 0.024 | 0.023 | 0.01 | 0.07 | 0.07 | — | 0.07 |
| (f-1) | 40 | 31 | 30 | 49 | 26 | 40 | 32 | 30 | 40 |
| (f-2) | — | 20 | — | 40 | — | — | — | — | — |
| (h) | 30 | 25 | 23 | 29 | 20 | 30 | 23 | 30 | 30 |
| Reaction conditions | | | | | | | | | |
| Temp. ° C. | 60 | 60 | 60 | 60 | 60 | 60 | 60 | 60 | 60 |
| Hours | 4 | 3 | 5 | 4 | 2.5 | 4 | 4 | 4 | 4 |
| Supplemental component (weight part) added after reaction | | | | | | | | | |
| (g-1) | 20 | 7 | 12 | 10 | 20 | 20 | 20 | 20 | 20 |
| (g-2) | — | 16 | — | — | — | — | — | — | — |
| (d) | FP-3 | FP-3 | FP-6 | FP-9 | FP-17 | FP-14 | FP-3 | FP-3 | — |
| Amount* | 20 | 15 | 20 | 30 | 25 | 20 | 20 | 20 | — |
| Total solid content (wt. %) | 42 | 40.25 | 43.2 | 45.5 | 43.75 | 42 | 42 | 42 | 35 |

(Remark)
(a-01): Methyltrimethoxysilane
(a-02): y-Glycidoxypropyltrimethoxysilane
(b-01): Dimethyldimethoxysilane
(c-1): Kaneka-Zemrack
(c-2): Solution of silyl-containing vinyl resin
(e-1): Diisopropoxyaluminum ethylacetoacetate
(e-2): Aluminum tris(ethyl)acetoacetate
(e-3): Diisopropoxytitanium bis (acetylacetonato)
(e-4): Tri-n-butoxyzirconium ethylacetoacetate
(f-1): Isopropyl alcohol
(f-2): Ethylene glycol monobutyl ether
(h): Ion exchanged water
(g-1): Acetylacetone
(g-2): Ethyl acetoacetate
Amount*: Amount of the component (d) based on the total solid amount (wt. %)

TABLE 4

| Composition | F | G | H | I | J | K | U | V | W |
|---|---|---|---|---|---|---|---|---|---|
| Index** | 1.42 | 1.41 | 1.39 | 1.42 | 1.40 | 1.38 | 1.49 | 1.44 | 1.44 |
| Reflectance | 0.3 | 0.2 | 0.1 | 0.3 | 0.2 | 0.1 | 1.7 | 0.5 | 0.6 |
| Strength | 4 | 4 | 4 | 4 | 4 | 4 | 3 | 1 | 4 |

(Remark)
Index**: Refractive index of low refractive index layer

EXAMPLE 3

Anti-reflection films were prepared and evaluated in the same manner as in Example 1, except that the composition was changed as is shown in Table 5. The results are set forth in Table 6.

The anti-reflection film was provided on the surface of the liquid crystal display of a personal computer (PC9821NS/340W, Nippon Electric Co. Ltd.) to prepare a sample display device. The reflection on the surface of each sample was observed, and found that the sample provided with the film of the invention exhibited excellent visibility.

TABLE 5

| Composition | L | M | N | O | P | Q | S | T |
|---|---|---|---|---|---|---|---|---|
| Initially added component (weight part) | | | | | | | | |
| (a-01) | 100 | 100 | 60 | 100 | 100 | 100 | 100 | 100 |
| (a-03) | — | — | 40 | — | — | — | — | — |
| (b-01) | 50 | 40 | 50 | 50 | 50 | 50 | 50 | 50 |
| (b-02) | — | — | — | 25 | — | — | — | — |
| (c-3) | — | — | 50 | — | — | — | — | — |
| (c-4) | 50 | — | — | 50 | 20 | — | — | — |
| (c-5) | — | 60 | — | — | 30 | 50 | — | — |
| (e-1) | 20 | 15 | — | 20 | — | 20 | 20 | — |
| (e-2) | — | — | 10 | — | — | — | — | — |
| (e-3) | — | — | — | — | 10 | — | — | — |
| mol of (e) | 0.07 | 0.05 | 0.024 | 0.07 | 0.027 | 0.07 | 0.07 | — |
| (f-1) | 40 | 30 | 50 | 40 | 50 | 40 | 32 | 42 |
| (f-2) | — | 10 | — | 40 | — | — | — | — |
| (h) | 30 | 30 | 30 | 30 | 30 | 30 | 23 | 30 |
| Reaction conditions | | | | | | | | |
| Temp. (° C.) | 60 | 60 | 60 | 60 | 60 | 60 | 60 | 60 |
| Hour | 4 | 4 | 5 | 4 | 3 | 4 | 4 | 4 |
| Supplemental component (weight part) added after reaction | | | | | | | | |
| (g-1) | 20 | — | 8 | 20 | — | 20 | 20 | 20 |
| (g-2) | — | 15 | — | — | 16 | — | — | — |
| Mol of (g) | 0.2 | 0.15 | 0.08 | 0.2 | 0.12 | 0.2 | 0.2 | 0.2 |
| Total solid content (wt. %) | 35 | 36 | 38 | 36 | 35 | 35 | 35 | 35 |

(Remark)
(a-01): Methyltrimethoxysilane
(a-03): $C_2F_5OCH_2CH_2CH_2Si(OCH_3)_3$
(b-01): Dimethyldimethoxysilane
(b-02): $(CF_3CH_2CH_2)_2Si(OCH_3)_2$
(c-3): Vinyl resin P2 (solid content: 50 wt. %)
(c-4): Vinyl resin P12 (solid content: 50 wt. %)
(c-5): Vinyl resin P15 (solid content: 50 wt. %)
(e-1): Diisopropoxyaluminum ethylacetoacetate
(e-2): Aluminum tris(ethyl)acetoacetate
(e-3): Diisopropoxytitanium bis (acetylacetonato)
(f-1): Isopropyl alcohol
(f-2): Ethylene glycol monobutyl ether
(h): Ion exchanged water
(g-1): Acetylacetone
(g-2): Ethyl acetoacetate

TABLE 6

| Composition | L | M | N | O | P | Q | S | T |
|---|---|---|---|---|---|---|---|---|
| Reflectance | 0.3 | 0.2 | 0.4 | 0.3 | 0.3 | 0.2 | 1.9 | 0.6 |
| Strength | 4 | 4 | 4 | 4 | 4 | 4 | 3 | 1 |

We claim:

1. An anti-reflection film having a first layer and a second layer, wherein the first layer has a higher refractive index than the second layer, and wherein the second layer is formed by coating a composition comprising: (a) a hydrolysis product or a partial condensation product of an organosilane represented by the formula of $R^1Si(OR^2)_3$ in which $R^1$ is an alkyl group having 1 to 10 carbon atoms, an alkenyl group having 2 to 10 carbon atoms or an aryl group having 6 to 10 carbon atoms, and $R^2$ is an alkyl group having 1 to 5 carbon atoms or an acyl group having 1 to 4 carbon atoms; and (b) a vinyl resin having at least one silyl group substituted with a hydrolyzable group or hydroxyl in an amount of 2 to 300 weight parts.

2. The anti-reflection film as defined in claim 1, wherein $R^1$ in the formula of $R^1Si(OR^2)_3$ is a fluorine-substituted alkyl group having 1 to 10 carbon atoms, a fluorine-substituted alkenyl group having 2 to 10 carbon atoms or a fluorine-substituted aryl group having 6 to 10 carbon atoms.

3. The anti-reflection film as defined in claim 1, wherein the vinyl resin contains a fluorine atom.

4. The anti-reflection film as defined in claim 1, wherein the composition further comprises (c) a hydrolysis product or a partial condensation product of a diorganosilane represented by the formula of $R^1{}_2Si(OR^2)_2$ in which $R^1$ is an alkyl group having 1 to 10 carbon atoms, an alkenyl group having 2 to 10 carbon atoms or an aryl group having 6 to 10 carbon atoms, and $R^2$ is an alkyl group having 1 to 5 carbon atoms or an acyl group having 1 to 4 carbon atoms.

5. The anti-reflection film as defined in claim 4, wherein $R^1$ in the formula of $R^1{}_2Si(OR^2)_2$ is a fluorine-substituted alkyl group having 1 to 10 carbon atoms, a fluorine-substituted alkenyl group having 2 to 10 carbon atoms or a fluorine-substituted aryl group having 6 to 10 carbon atoms.

6. The anti-reflection film as defined in claim 1, wherein the composition further comprises (d) particles of a fluorine-containing polymer having a mean particle size of 5 to 200 nm.

7. The anti-reflection film as defined in claim 1, wherein the composition further comprises (e) at least one metal-chelate compound comprising a central metal which is selected from the group consisting of Zr, Ti or Al, an alcohol ligand represented by the formula of $R^3OH$ in which $R^3$ is an alkyl group having 1 to 6 carbon atoms and a diketone ligand represented by the formula of $R^4COCH_2COR^5$ in which $R^4$ is an alkyl group having 1 to 6 carbon atoms, and $R^5$ is an alkyl group having 1 to 5 carbon atoms or an alkoxy group having 1 to 16 carbon atoms.

8. The anti-reflection film as defined in claim 7, wherein the composition further comprises (g) a β-diketone or a β-ketoester represented by the formula of $R^4COCH_2COR^5$ in which $R^4$ is an alkyl group having 1 to 6 carbon atoms, $R^5$ is an alkyl group having 1 to 5 carbon atoms or an alkoxy group having 1 to 16 carbon atoms.

9. The anti-reflection film as defined in claim 1, wherein the composition further comprises (f) an organic solvent selected from the group consisting of an alcohol, an aromatic hydrocarbon, an ether, a ketone and an ester.

10. The anti-reflection film as defined in claim 1, wherein the composition comprises (a) the hydrolysis product or a partial condensation product of the organosilane in an amount of 100 weight parts in terms of the organosilane and (b) the vinyl resin in an amount of 2 to 300 weight parts.

11. The anti-reflection film as defined in claim 1, wherein the second layer comprises an organic silane polymer having a network structure formed by coating the composition.

12. The anti-reflection film as defined in claim 1, wherein the anti-reflection film further has a third layer, the first layer is arranged between the third layer and the second layer, the layers have such refractive indexes that the refractive index of the third layer is between the refractive index of the second layer and the refractive index of the first layer.

13. The anti-reflection film as defined in claim 12, wherein the third layer has a refractive index of from 1.5 to 1.7.

14. A display device having a display surface covered with the anti-reflection film defined in claim 1, wherein the first layer is arranged between the display surface and the second layer.

15. The anti-reflection film as defined in claim 1, wherein the first layer has a refractive index of greater than 1.70.

16. The anti-reflection film as defined in claim 15, wherein the second layer has a refractive index of at least 0.1 less than the first layer.

17. The anti-reflection film as defined in claim 1, wherein the second layer has a refractive index of at least 0.1 less than the first layer.

* * * * *